US012762738B2

(12) United States Patent
Macklin et al.

(10) Patent No.: US 12,762,738 B2
(45) Date of Patent: Oct. 13, 2026

(54) COMPUTING ANGLE-WEIGHTED NORMALS

(71) Applicant: NVIDIA Corporation, Santa Clara, CA (US)

(72) Inventors: Miles Macklin, Auckland (NZ); Nuttapong Chentanez, Bangkok (TH)

(73) Assignee: NVIDIA Corporation, Santa Clara, CA (US)

( * ) Notice: Subject to any disclaimer, the term of this patent is extended or adjusted under 35 U.S.C. 154(b) by 381 days.

(21) Appl. No.: 18/520,087

(22) Filed: Nov. 27, 2023

(65) Prior Publication Data

US 2025/0173896 A1 May 29, 2025

(51) Int. Cl.
*G06T 17/20* (2006.01)
*G06T 7/73* (2017.01)

(52) U.S. Cl.
CPC ................ *G06T 7/75* (2017.01); *G06T 17/20* (2013.01)

(58) Field of Classification Search
CPC ......... G06T 17/20; G06T 15/40; G06T 15/06; G06T 9/001; G06T 17/205
See application file for complete search history.

(56) References Cited

U.S. PATENT DOCUMENTS

| | | | | |
|---|---|---|---|---|
| 7,586,489 | B2 | 9/2009 | Muller-Fischer et al. | |
| 10,482,196 | B2 | 11/2019 | Eckart et al. | |
| 2009/0167763 | A1* | 7/2009 | Waechter ................ | G06T 15/40 345/426 |
| 2017/0249401 | A1* | 8/2017 | Eckart ................ | G06V 10/7625 |
| 2021/0287430 | A1 | 9/2021 | Li et al. | |

FOREIGN PATENT DOCUMENTS

| | | | | |
|---|---|---|---|---|
| CN | 116310119 A | * | 6/2023 | .......... G06T 17/005 |

OTHER PUBLICATIONS

A. Guezlec, ""Meshsweeper": dynamic point-to-polygonal mesh distance and applications," in IEEE Transactions on Visualization and Computer Graphics, vol. 7, No. 1, pp. 47-61, Jan.-Mar. 2001, doi: 10.1109/2945.910820. (Year: 2001).*

J. A. Baerentzen and H. Aanaes, "Signed distance computation using the angle weighted pseudonormal," in IEEE Transactions on Visualization and Computer Graphics, vol. 11, No. 3, pp. 243-253, May-Jun. 2005, doi: 10.1109/TVCG.2005.49. (Year: 2005).*

* cited by examiner

*Primary Examiner* — Stephen R Koziol
*Assistant Examiner* — Ashley Hytrek
(74) *Attorney, Agent, or Firm* — IRON SUMMIT IP LLP

(57) ABSTRACT

In various examples, determining angle-weighted normals for content processing systems and applications is described herein. Systems and methods are disclosed that determine an angle-weighted normal, such as during a traversal of a bounding volume hierarchy (BVH) of a three-dimensional (3D) object, and then use the angle-weighted normal to determine whether a query point is located inside or outside of the 3D object. To determine the angle-weighted normal, triangles that potentially include a closest point to the query point may be identified, such as during the traversal of the BVH to identify the closest point on the 3D object to the query point. The potential triangles may then be analyzed to determine one or more triangles for which the closest point is located. Additionally, one or more weights and/or one or more surface normals associated with the triangle(s) may be used to calculate the angle-weighted normal.

20 Claims, 11 Drawing Sheets

COMPUTING ANGLE-WEIGHTED NORMALS

BACKGROUND

For many applications, such as graphics rendering applications, simulation applications, gaming applications, and/or so forth, three-dimensional (3D) objects may be represented using polygon meshes, such as triangle meshes. When representing (e.g., graphically) multiple 3D objects in the same space, it may be important to determine how the 3D objects relate with one another. For example, it may be important to determine whether the 3D objects intersect with one another and/or whether a given path of one of the 3D objects collides with the other 3D object. One technique to determine such relationships between 3D objects is to initially determine whether a given point or position within a 3D space representing a scene or environment is located internally (e.g., non-visibly) with respect to a 3D object or external to the 3D object. As such, numerous techniques have been developed to make such determinations.

For instance, some techniques use ray casting to determine whether a given point within space is inside or outside of a 3D object. For example, ray casting may be performed from the specific point and in different directions where, for each direction, a number of times that the ray intersects with the 3D object in the 3D space is determined. In most ray casting techniques, ray casting is performed by traversing a bounding volume hierarchy (BVH) associated with the object or at least a portion of a BVH associated with the 3D space corresponding to the object over a number of iterations, such as three iterations along three different directions (e.g., the x-direction, the y-direction, and the z-direction). If all three iterations indicate an intersection between a ray cast from the specific point and the 3D object as represented in the 3D space, such as by the number of times that the ray intersects with the 3D object being odd, then it is determined that the specific point is located within the 3D object. However, while such techniques provide good results in some circumstances, ray casting may not work for non-watertight mesh objects, may include high compute costs, and/or may require multiple traverses through the BVH-resulting in high latency.

As such, other techniques may use surface normal computations to determine whether a given point is inside or outside of a 3D object. For instance, a closest point on the 3D object to the specific point may be determined. An inner product of the surface normal at the closest point with a vector that is between the closest point and the specific point is then taken. If the inner product is positive, then the specific point is located outside of the 3D object and if the inner product is negative, then the specific point is located inside of the 3D object. While these techniques work well for closed, smooth, and orientable surfaces of objects, these techniques may not work for objects that are represented using meshes. For instance, if the closest point is located at an edge or a vertex of a triangle from a triangle mesh, then the surface normal may not be defined.

Because of this, some techniques may determine angle-weighted pseudo-normals associated with such a 3D object and use the angle-weighted pseudo-normals to determine whether a specific point is located inside or outside of the 3D object. For instance, an angle-weighted pseudo-normal for a point on a surface of a triangle may be determined as the surface normal of the triangle, an angle-weighted pseudo-normal for a point on an edge of triangles may be determined as an average of each surface normal of the two triangles associated with the edge, and an angle-weighted pseudo-normal for a point on a vertex of triangles may be determined as a weighted sum of each surface normal of the triangles associated with the vertex. However, while such techniques can provide acceptable results in some circumstances, such techniques may not work for disconnected mesh parts and/or non-watertight mesh objects. Additionally, such techniques may require preprocessing to determine the angle-weighted pseudo-normals and/or may require a large amount of memory to store the angle-weighted pseudo-normals.

SUMMARY

Embodiments of the present disclosure relate to determining angle-weighted normals for content processing systems and applications. Systems and methods are disclosed that determine an angle-weighted normal (also referred to as an "angle-weighted pseudo-normal"), such as during a traversal of a bounding volume hierarchy (BVH) of a three-dimensional (3D) object or a portion of a BVH of a 3D space that corresponds to the 3D object, and then use the angle-weighted normal to determine whether a query point is located inside or outside of the 3D object. To determine the angle-weighted normal, triangles that potentially include a closest point to the query point may be identified, such as during the traversal of the BVH to identify the closest point on the 3D object to the query point. The potential triangles may then be analyzed to determine one or more triangles for which the closest point is located. Additionally, one or more weights and/or one or more surface normals associated with the triangle(s) may be used to calculate the angle-weighted normal.

In contrast to conventional systems, such as those described above, the current systems, in some embodiments, are able to determine whether a query point is located inside or outside of a 3D object that includes disconnected mesh parts and/or that is non-watertight. Additionally, in contrast to the conventional systems, the current systems, in some embodiments, are able to determine whether a query point is located inside or outside of a 3D object using only a single traversal through a BVH associated with the 3D object or space. For instance, and as discussed above, the techniques that use ray casting include multiple instances of traversing through the BVH, such as one for each direction being analyzed. Additionally, the techniques that use angle-weighted pseudo-normals traverse through the BVH during preprocessing to determine the angle-weighted pseudo-normals and again traverse through the BVH during processing of a query point to identify a closest point on the 3D object to the query point.

Furthermore, in contrast to the conventional systems, the current systems, in some embodiments, do not require performing any type of preprocessing and/or storing extra data that is later used to determine whether the query point is located inside or outside of the 3D object. Rather, the current systems may determine the angle-weighted normal during the same traversal that the current systems use to also identify the closest point on the 3D object to the query point. This provides improvements over the conventional systems, such as by saving computing resources (e.g., processing resources, memory resources, etc.).

BRIEF DESCRIPTION OF THE DRAWINGS

The present systems and methods for determining angle-weighted normals for content processing systems and applications are described in detail below with reference to the attached drawing figures, wherein.

DETAILED DESCRIPTION

Figure 1:
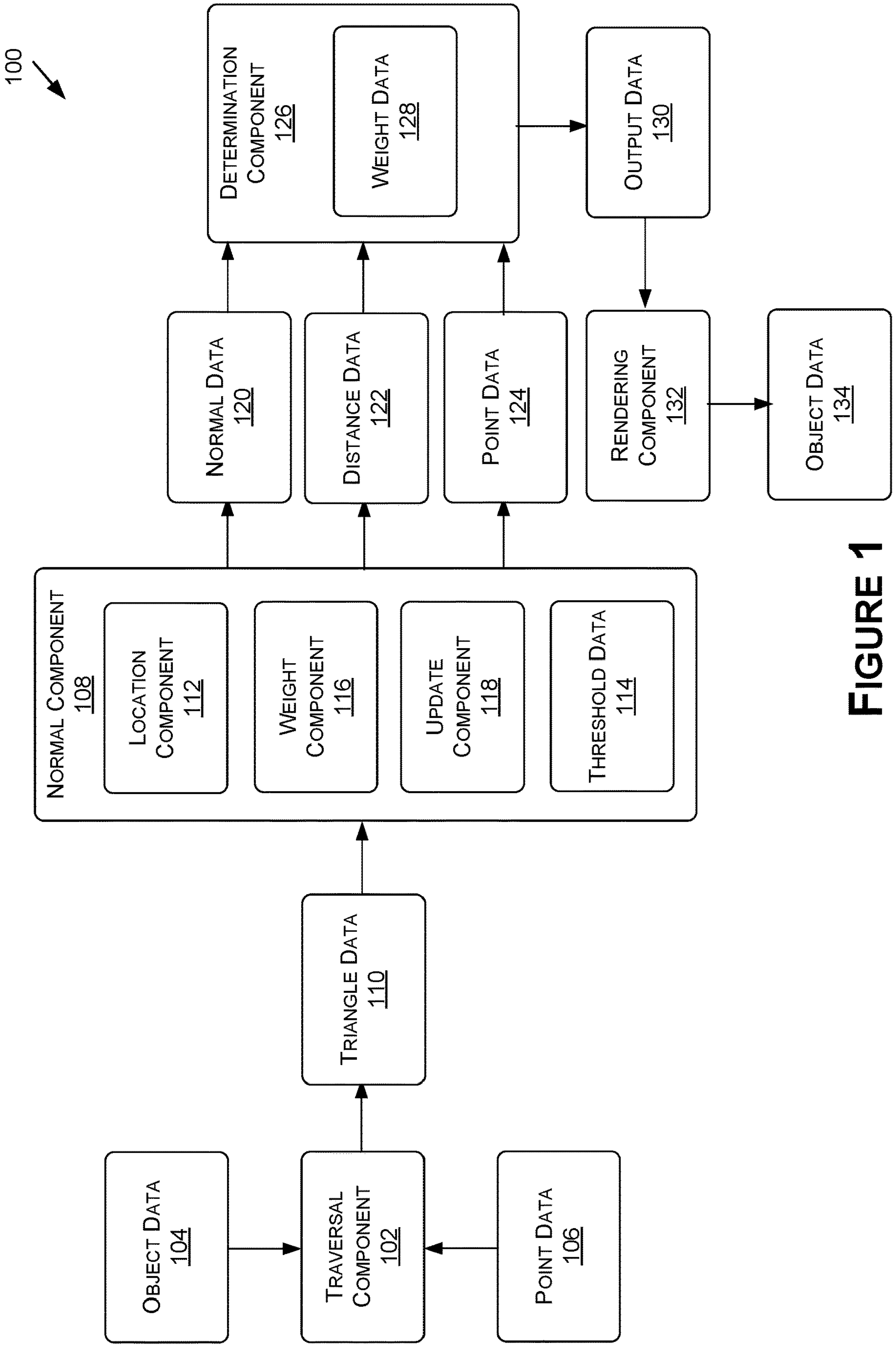
FIG. 1 illustrates an example data flow diagram for a process of determining an angle-weighted normal that is then used to determine whether a query point is located inside, outside, or on a surface of a 3D object, in accordance with some embodiments of the present disclosure.

Systems and methods are disclosed related to determining angle-weighted normals for content processing systems and applications. For instance, a system(s) may receive, generate, obtain, and/or retrieve at least data of a three-dimensional (3D) object in a 3D space representing an environment or scene. As described herein, in some examples, the 3D object is represented using a mesh, such as a triangle mesh (and/or any other type of mesh). The system(s) may also receive, generate, obtain, and/or retrieve data representing a bounding volume hierarchy (BVH) associated with the 3D space. As described herein, the BVH may include nodes arranged in a tree structure, where a top level node includes all of the triangles of the triangle mesh, middle level nodes include partitioned portions of the triangles, and bottom level nodes (e.g., leaf nodes) each include one or more of the triangles. In some examples, the triangles included within the nodes may be in close proximity to one another on the triangle mesh. For example, a leaf node may include triangles that are close in proximity, such as by sharing one or more edges and/or one or more vertices with one another.

The system(s) may then use the data to determine whether a query point is located inside of the 3D object, outside of the 3D object, or on a surface of the 3D object. For instance, and using the query point, the system(s) may traverse through the BVH to determine at least a leaf node that includes triangles that potentially include a closest point to the query point. In some circumstances, the system(s) determines the leaf node by traversing down through the levels of the BVH following nodes for which there is an intersection with a ray traced from the query point, which is described in more detail herein. The system(s) may then analyze the triangles associated with the leaf node (and/or one or more other leaf nodes) in order to determine information that is then used to determine whether the query point is located inside, outside, or on the surface of the 3D object. As described herein, the information may include, but is not limited to, a minimum distance between the closest point and the query point, an angle-weighted normal associated with the closest point, coordinates (e.g., barycentric coordinates) associated with the query point, coordinates (e.g., barycentric coordinates) associated with the closet point, one or more triangles for which the closet point is located, and/or any other information.

For instance, the system(s) may analyze a first triangle in order to determine a first closest point on the first triangle to the query point and a first minimum distance between the first closest point and the query point. The system(s) may then use one or more techniques, described in more detail herein, to determine whether the first closest point is located at a vertex, along an edge, or on a face of the first triangle. Additionally, the system(s) may then determine a first weight associated with the first closest point, where the first weight may include a first set weight if the first closest point is located at the vertex, a second set weight if the first closest point is located along the edge, or a third set weight if the first closest point is located on the face. The system(s) may then store data representing at least the first minimum distance between the first closest point and the query point, first coordinates (e.g., barycentric coordinates) of the first closest point, the determined first weight, a first surface normal associated with the first triangle (e.g., the face of the first triangle), and/or any other information.

The system(s) may then analyze a second triangle using similar processes to determine at least a second closest point on the second triangle to the query point, a second minimum distance between the second closest point and the query point, a second weight associated with the second closest point, second coordinates of the second closest point, and a second surface normal associated with the second triangle (e.g., the face of the second triangle). If the system(s) determines that the second minimum distance is less than the first minimum distance (and/or less than the first minimum distance minus a tolerance distance), then the system(s) may update the data since the second closest point is closer to the query point than the first closest point. For instance, the system(s) may update the data to represent the second minimum distance between the second closest point and the query point, the second coordinates (e.g., barycentric coordinates) of the second closest point, the second weight associated with the second closest point, the second surface normal associated with the second triangle, and/or any other information. Additionally, if the system(s) determines that the second minimum distance is greater than the first minimum distance (and/or the first minimum distance plus a tolerance distance), then the system(s) may refrain from updating the data since the first closest point is closer to the query point than the second closest point.

Furthermore, if the system(s) determines that the second minimum distance is substantially equal to the first minimum distance (e.g., within the tolerance distance to the first minimum distance), which is described in more detail herein, then the system(s) may update at least a portion of the data since the second closest point may include a same point as the first closest point (e.g., the points may be included on an edge and/or vertex shared by the triangles). For instance, the system(s) may update the data to further represent at least the second weight associated with the second closest point and the second surface normal associated with the second triangle. In some examples, the system(s) may further update the data to represent the second minimum distance instead of the first minimum distance if the second minimum distance is less than the first minimum distance. The system(s) may then continue to perform these processes using one or more additional triangles associated with the leaf node. Additionally, in some examples, the system(s) may continue to perform these processes using one or more additional triangles associated with one or more additional leaf nodes, such as one or more neighboring leaf nodes.

The system(s) may then use the data to determine the information that is used to determine whether the query point is located inside, outside, or on a surface of the 3D object. For instance, the system(s) may use the data, such as the data representing the respective weight of one or more points of one or more triangles found to include the closest point and/or the respective surface normal for the point(s), to determine the angle-weighted normal. The system(s) may also use the data to determine the coordinates (e.g., the barycentric coordinates) associated with the closest point, the triangle(s) that include(s) the closest point, and/or the minimum distance between the closest point and the query point. Additionally, the system(s) may then use the information to determine whether the query point is located inside, outside, or on a surface of the 3D object. For instance, the system(s) may use at least a portion of the information along with one or more equations, such as a signed distance equation and/or a dot product equation, to determine a value. The system(s) may then determine that the query point is located inside of the 3D object when the value is negative, located on the surface of the 3D object when the value is zero, or located outside of the 3D object when the value is positive.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems implementing one or more large language models (LLMs), systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of determining an angle-weighted normal that is then used to determine whether a query point is located inside, outside, or on a surface of a 3D object, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a traversal component 102 receiving object data 104 and point data 106. The object data 104 may represent at least a 3D object located in space, such as a 3D representation of a person, an animal, a structure, a vehicle, a machine, and/or any other type of object. In some examples, the 3D object is represented using a polygon mesh, such as a triangle mesh (and/or any other type of mesh). For instance, the object data 104 may represent a collection of vertices, edges, faces, polygons, and/or surfaces that define the shape of the 3D object. As described herein, a vertex may include a position (e.g., a coordinate position) in 3D space, an edge may include a connection between two vertices, and a face may include a closed set of edges, where a face of a triangle may include three edges.

Figure 2:
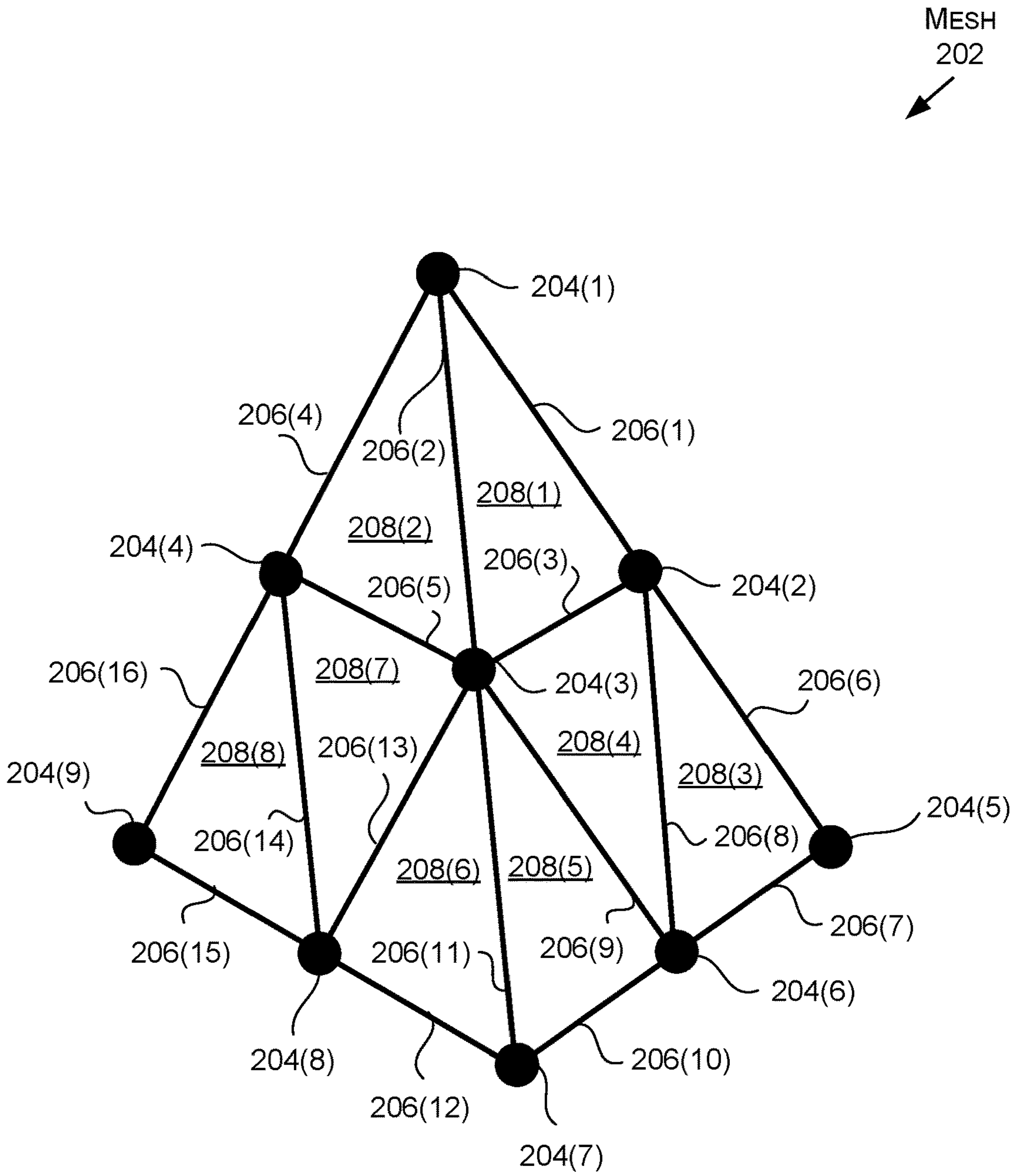
FIG. 2 illustrates an example of a triangle mesh associated with a 3D object, in accordance with some embodiments of the present disclosure.

For instance, FIG. 2 illustrates an example of a triangle mesh 202 associated with a 3D object, in accordance with some embodiments of the present disclosure. As shown by the example of FIG. 2, the triangle mesh 202 may include at least vertices 204(1)-(9) (also referred to singularly as "vertex 204" or in plural as "vertices 204"), edges 206(1)-(16) (also referred to singularly as "edge 206" or in plural as "edges 206") that include connections with the vertices 204, and faces 208(1)-(8) (also referred to singularly as "face 208" or in plural as "faces 208") that include a closed set of edges 206. For example, a triangle may be constructed using vertices 204(1)-(3), edges 206(1)-(3) that are connected between the vertices 204(1)-(3), and a face 208(1) that is enclosed by the edges 206(1)-(3). While the example of FIG. 2 only illustrates two sides of the triangle mesh 202, the triangle mesh 202 may further include another side and/or a bottom that also include vertices, edges, and/or faces.

Referring back to the example of FIG. 1, the object data 104 may further represent a BVH associated with the 3D object. As described herein, the BVH may include nodes arranged in a tree structure, where one or more (e.g., each) of the nodes is associated with one or more triangles from the 3D mesh. For instance, a top level node may be associated with all of the triangles of the triangle mesh, middle level nodes may be associated with partitioned portions of the triangles, and bottom level nodes (e.g., leaf nodes) may be associated with one or more of the triangles. In some examples, the triangles included within the nodes may be in close proximity to one another on the triangle mesh. For example, a leaf node may include triangles that are close in proximity, such as by sharing one or more edges and/or one or more vertices with one another.

Figure 3:
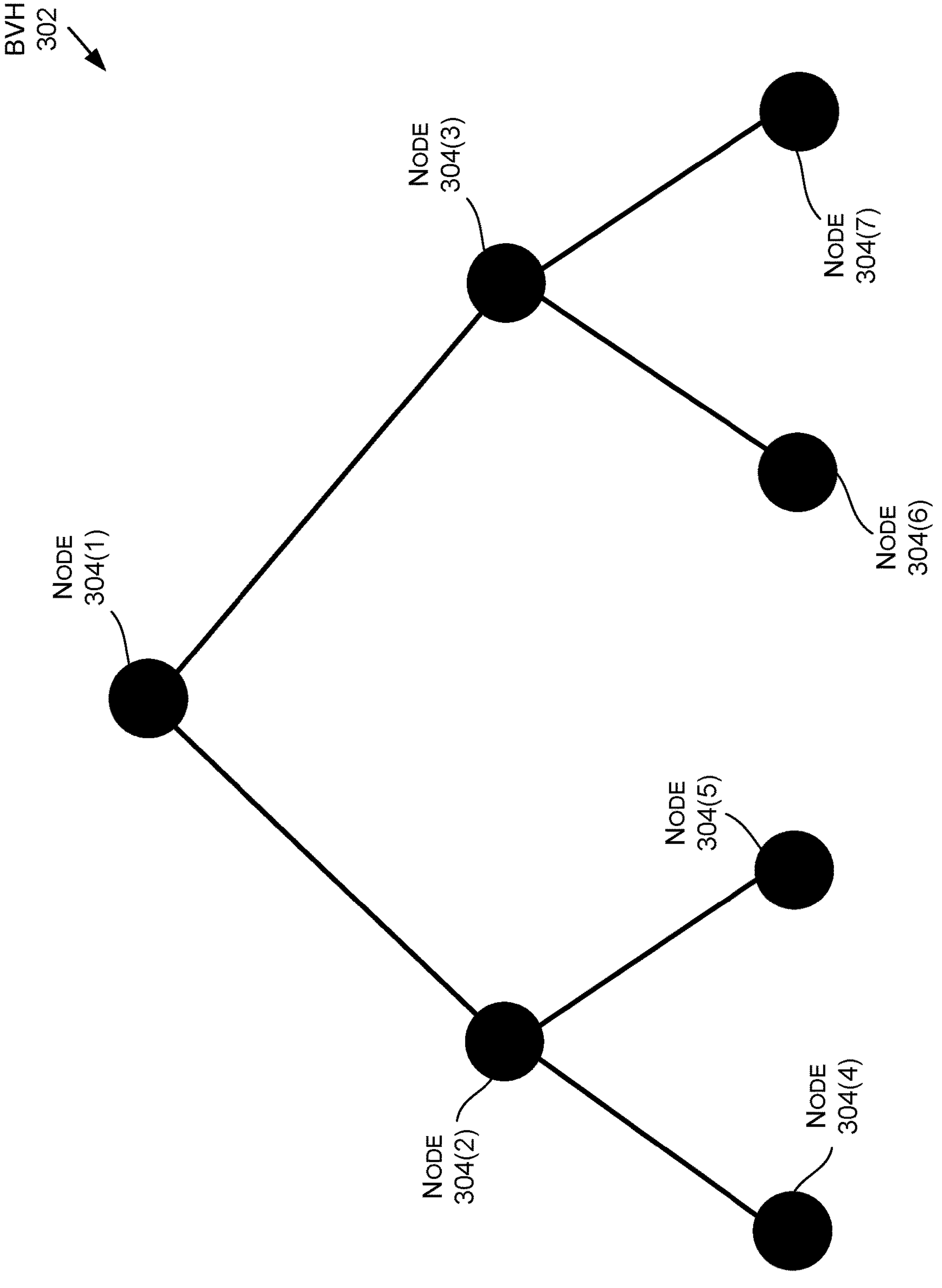
FIG. 3 illustrates an example of a bounding volume hierarchy associated with a 3D object, in accordance with some embodiments of the present disclosure.

For instance, FIG. 3 illustrates an example of a BVH 302 associated with the triangle mesh 202, in accordance with some embodiments of the present disclosure. As shown by the example of FIG. 3, the BVH 302 may include a number of nodes 304(1)-(7) (also referred to singularly as "node 304" or in plural as "nodes 304") that are arranged in a tree structure. For instance, the first node 304(1) may include a top level node, the nodes 304(2)-(3) may include intermediary level nodes, and the nodes 304(4)-(7) may include bottom level nodes (also referred to as "leaf nodes"). As described herein, the nodes 304 may be associated with one or more of the triangles associated with the triangle mesh 202 of the 3D object.

For example, the first node 304(1) may be associated with all of the triangles of the triangle mesh 202. The triangles may then be partitioned between the nodes 304(2)-(3). For example, the second node 304(2) may be associated with the triangles located a first side (e.g., the triangles associated with the faces 208(1) and 208(3)-(5)) and the triangles located on a second side (e.g., the triangles associated with the faces 208(2) and 208(6)-(8)), and the third node 304(3) may be associated with the triangles located on a third side (e.g., the side that is not illustrated in the example of FIG. 2) and the triangles located on the bottom (which is also not illustrated in the example of FIG. 2). The triangles may then further be partitioned between the nodes 304(4)-(7). For example, the fourth node 304(4) may be associated with the triangles located on the first side (e.g., the triangles associated with the faces 208(1) and 208(3)-(5)), the fifth node 304(5) may be associated with the triangles located on the second side (e.g., the triangles associated with the faces 208(2) and 208(6)-(8)), the sixth node 304(6) may be associated with the triangles located on the third side (e.g., the side that is not illustrated in the example of FIG. 2), and the seventh node 304(7) may be associated with the triangles located on the bottom (which is also not illustrated in the example of FIG. 2).

Referring back to the example of FIG. 1, the point data 106 may represent coordinates associated with a point (also referred to as a "query point") located within the same space as the 3D object. As such, the process 100 may include the traversal component 102 identifying one or more triangles that are located within proximity to the query point. For instance, the traversal component 102 may determine the triangle(s) of the 3D object that potentially includes a closest point to the query point. In some examples, to identify the triangle(s), the traversal component 102 may traverse through the BVH to determine at least a leaf node that includes the triangle(s) that potentially includes the closest point to the query point. For instance, the traversal component may traverse down through the levels of the BVH following nodes for which there is an intersection with a ray traced from the query point.

For example, and referring back to the examples of FIGS. 2 and 3, the traversal component 102 may project a ray from the query point towards the triangle mesh 202. The traversal component 102 may then identify the first node 304(1) as including one or more triangles that may intersected by the ray. As such, the traversal component 102 may move to the next level of nodes, such as the intermediary nodes 304(2)-(3). The traversal component 102 may then determine that one or more triangles associated with the second node 304(2) may intersect with the ray while the triangles associated with the third node 304(3) do not intersect with the ray. As such, the traversal component 102 may move to the next level of nodes, such as the leaf nodes 304(3)-(5) associated with the second node 304(2). The traversal component 102 may then determine that one or more triangles associated with the fourth node 304(4) may intersect with the ray while the triangles associated with the fifth node 304(5) do not intersect with the ray. As such, since the fourth node 304(4) includes a leaf node, the traversal component 102 may identify the triangles associated with the fourth node 304(4).

Referring back to the example of FIG. 1, the process 100 may include a normal component 108 receiving triangle data 110 from the traversal component 102, where the triangle data 110 represents at least the triangle(s) that the traversal component 102 identified as potentially including the closest point to the query point. The normal component 108 may then process at least the triangle data 110 to determine information that may then be used to determine whether the query point is located inside (e.g., within a volume enclosed by) the 3D object, located outside of (e.g., the volume enclosed by) the 3D object, or located on a surface of the 3D object. As described herein, the information may include, but is not limited to, a minimum distance between the closest point and the query point, an angle-weighted normal associated with the closest point, coordinates (e.g., barycentric coordinates) associated with the query point, coordinates (e.g., barycentric coordinates) associated with the closet point, one or more triangles for which the closet point is located, and/or any other information.

For instance, and for a triangle, the process 100 may include the normal component 108 using a location component 112 to determine a closest point on the triangle and/or a minimum distance between the closest point and the query point. The location component 112 may then determine whether the closest point is located on a face of the triangle, along an edge of the triangle, or at a vertex of the triangle. Additionally, if the closest point is located at or along an edge or a vertex of the triangle, the location component 112 may identify the specific edge or specific vertex for which the closest point is located. As described in more details herein, the location component 112 may use one or more techniques to make these determinations, such as barycentric coordinates associated with one or more of the points located on the face, the edges, and/or the vertices and/or distances between the point(s) and the query point.

Figure 4A:
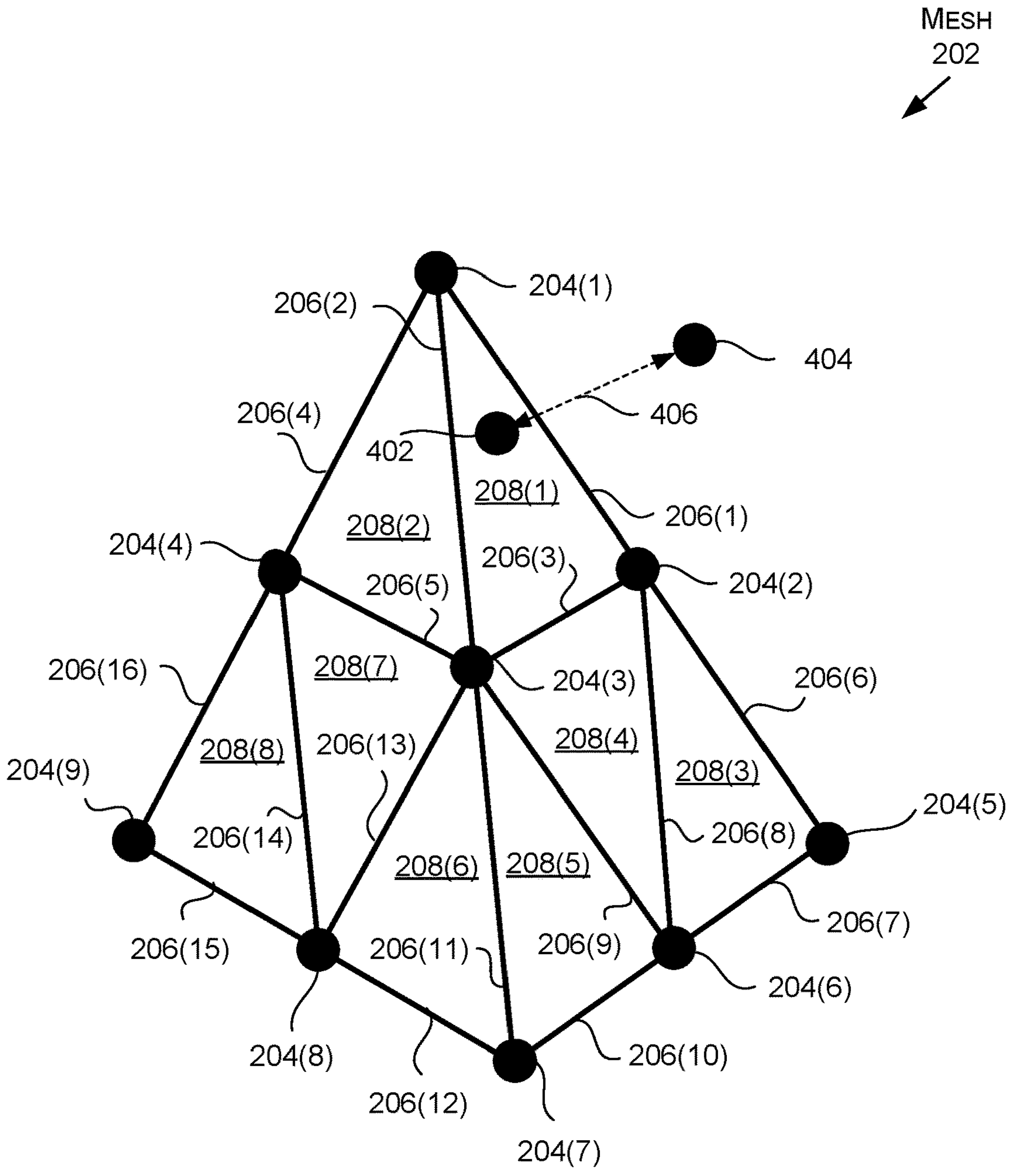
FIGS. 4A-4C illustrate examples of determining closest points on triangles to query points, in accordance with some embodiments of the present disclosure.
Figure 4B:
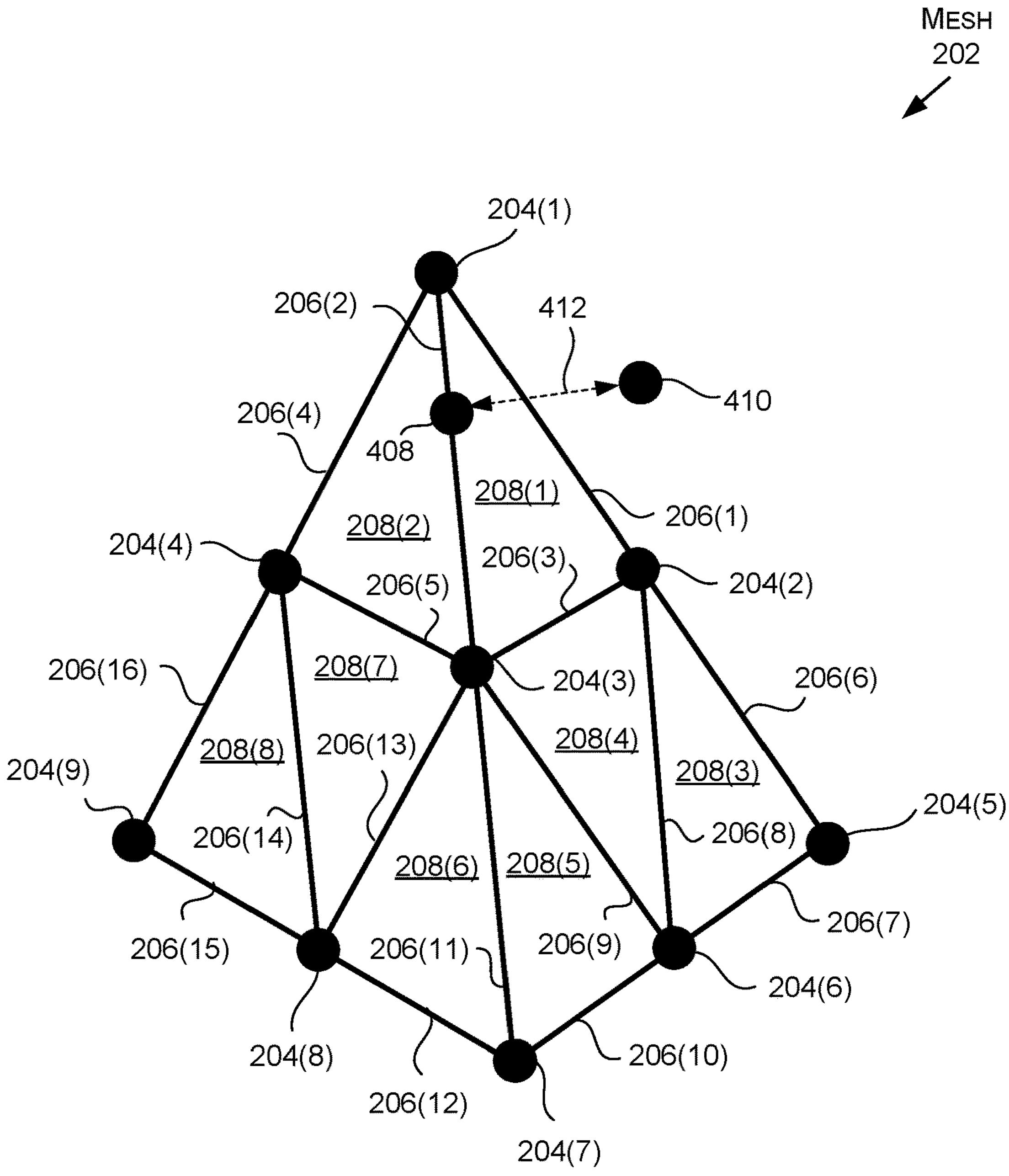
Figure 4C:
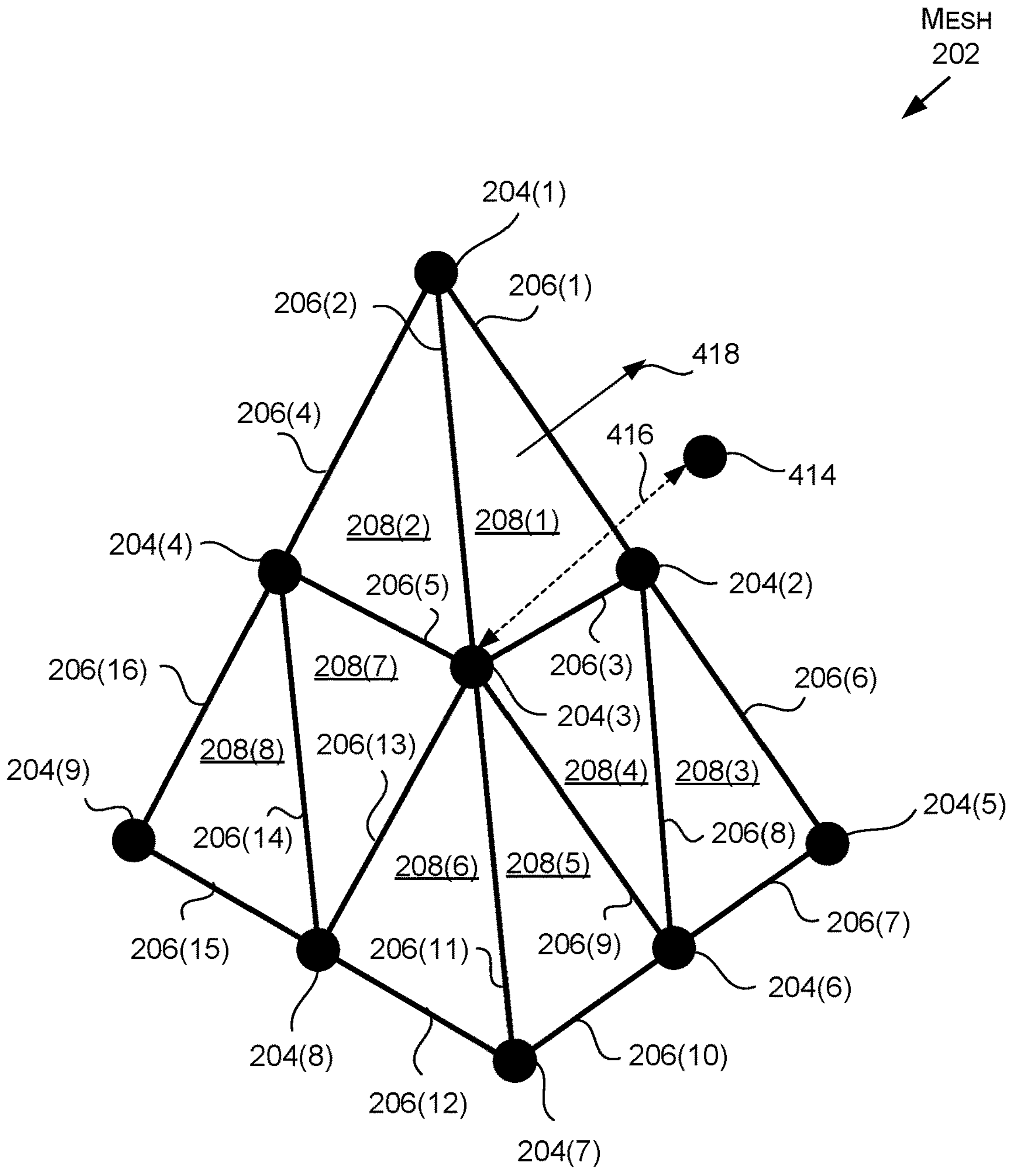

For instance, FIGS. 4A-4C illustrate examples of determining closest points on triangles to query points, in accordance with some embodiments of the present disclosure. As shown by the example of FIG. 4A, the location component 112 may determine that a point 402 includes a closet point on a triangle associated with the first face 208(1) to a query point 404 (e.g., the closest point 402 includes a minimum distance 406 to the query point 404). The location component 112 may then determine that the closest point 402 is located on the first face 208(1) of the triangle. Additionally, as shown by the example of FIG. 4B, the location component 112 may determine that a point 408 includes a closet point on the triangle associated with the first face 208(1) to a query point 410 (e.g., the closest point 408 includes a minimum distance 412 to the query point 410). The location component 112 may then determine that the closest point 408 is located along the second edge 206(2) of the triangle. Furthermore, as shown by the example of FIG. 4C, the location component 112 may determine that the point 204(3) includes a closet point on the triangle associated with the first face 208(1) to a query point 414 (e.g., the closest point 204(3) includes a minimum distance 416 to the query point 414). The location component 112 may then determine that the closest point 204(3) is located at the third vertex 204(3) of the triangle.

Figure 5:
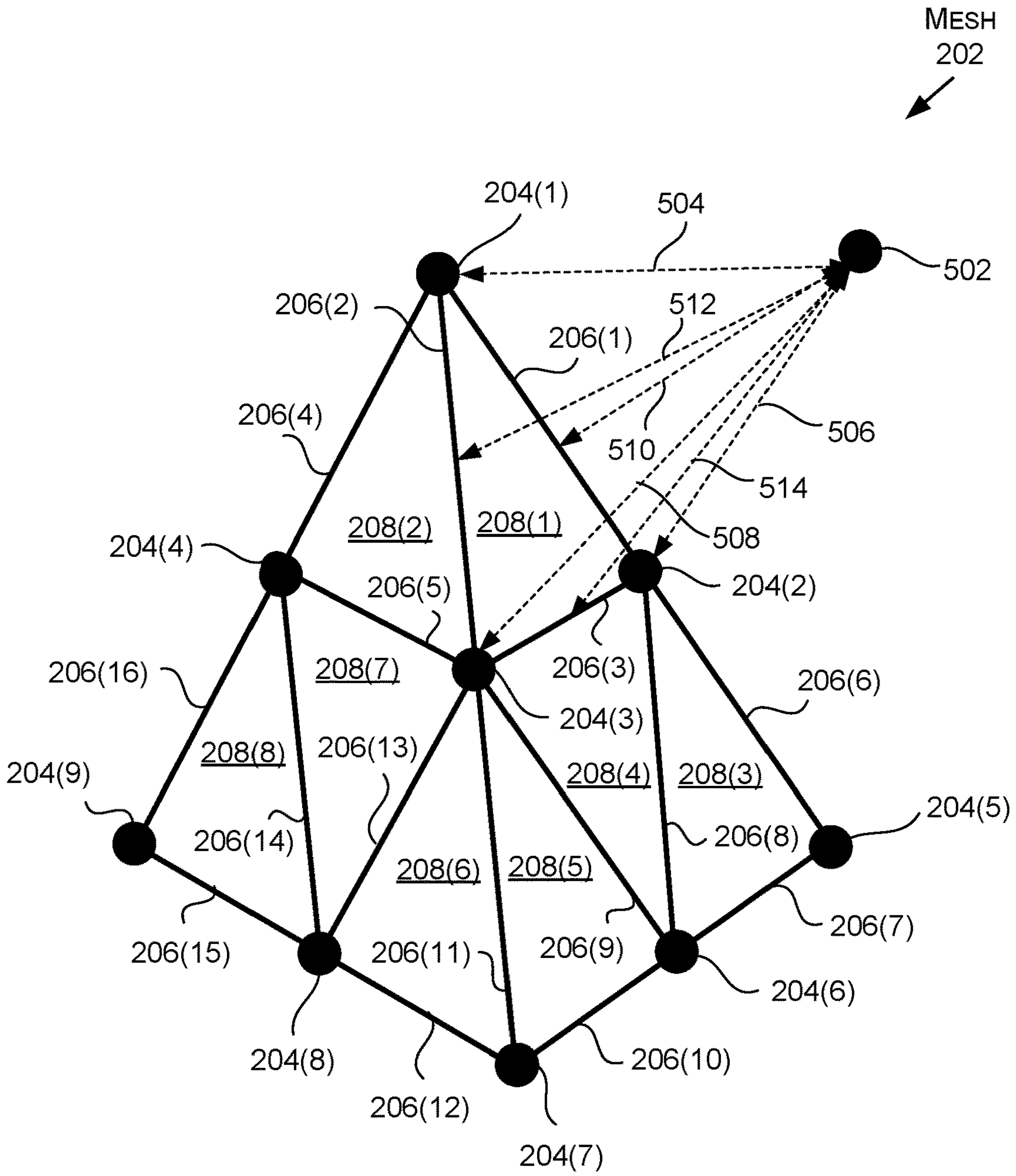
FIG. 5 illustrates an example of determining whether a closest point is on a face, an edge, or a vertex of a triangle, in accordance with some embodiments of the present disclosure.

Still, for more detail, FIG. 5 illustrates an example of determining whether a closest point is on a face 208, an edge 206, or a vertex 204 of a triangle, in accordance with some embodiments of the present disclosure. In the example of FIG. 5, the location component 112 may determine a tolerance distance (e.g., a threshold, which may be represented by threshold data 114) for determining a closest distance between a query point 502 and the triangle mesh 202. The location component 112 may then determine one or more distances between the query point 502 one or more (each) of the vertices 204. For instance, the location component 112 may determine a first distance 504 between the first vertex 204(1) and the query point 502, a second distance 506 between the second vertex 204(2) and query point 502, and a third distance 508 between the query point 502 and the third vertex 204(3).

The location component 112 may then determine that the first vertex 204(1) includes the closest point based at least on the first distance 504 being less than the tolerance distance. If the first distance 504 is not less than the tolerance distance, then the location component 112 may determine that the second vertex 204(2) is the closest point based at least on the second distance 506 being less than the tolerance distance. Still, if the second distance 506 is not less than the tolerance distance, then the location component 112 may determine that the third vertex 204(3) is the closest point based at least on the third distance 508 being less than the tolerance distance. However, if the location component 112 determines that none of the distances 504, 506, and 508 are less than the tolerance distance, then the location component 112 may determine that the closest point does not include any of the vertices 204(1)-(3) of the triangle.

The location component 112 may then determine one or more distances between the query point 502 one or more (each) of the edges 206. For instance, the location component 112 may determine a first minimum distance 510 between the first edge 206(1) and the query point 502, a second minimum distance 512 between the second edge 206(2) and the query point 502, and a third minimum distance 514 between the third edge 206(3) and the query point 502. The location component 112 may then determine that the first edge 206(1) includes the closest point based at least on the first minimum distance 510 being less than the tolerance distance. If the first minimum distance 510 is not less than the tolerance distance, then the location component 112 may determine that the second edge 206(2) includes the closest point based at least on the second minimum distance 512 being less than the tolerance distance. Still, if the second minimum distance 512 is not less than the tolerance distance, then the location component 112 may determine that the third edge 206(3) includes the closest point based at least on the third minimum distance 514 being less than the tolerance distance. However, if the location component 112 determines that none of the minimum distances 510, 512, and 514 are less than the tolerance distance, then the location component 112 may determine that the closest point is not located along any of the edges 206(1)-(3) of the triangle. Additionally, the location component 112 may determine that the closest point is located on the first face 208(1) of the triangle.

While the example of FIG. 5 describes the location component 112 as using the distances 504, 506, and 508 between the query point 502 and the vertices 204(1)-(3) and/or the minimum distances 510, 512, and 514 between the query point 502 and the edges 206(1)-(3), in other examples, the location component 112 may use additional and/or alternative distances. For instance, the location component 112 may determine barycentric coordinates associated with the query point 502 using an identified closest point. The location component 112 may then determine distances between the vertices 204(1)-(3) and the query point and distances between the edges 206(1)-(3) and the query point using the barycentric coordinates (e.g., using absolute values). Additionally, the location component 112 may then perform similar processes to determine whether the closest point is one of the vertices 204(1)-(3), located along one of the edges 206(1)-(3), or located on the first face 208(1).

For example, the location component 112 may process the distances associated with the vertices 204(1)-(3) and determine that the closest point is on one of the vertices 204(1)-(3) based at least on a respective distance being less than the tolerance distance. However, if none of the distances are less than the tolerance distance, then the location component 112 may process the distances associated with the edges 206(1)-(3) and determine that the closest point is located along one of the edges 206(1)-(3) based at least on a respective distance being less than the tolerance distance. However, if none of the distances are again less than the tolerance distance, then the location component 112 may determine that the closest point is located on the first face 208(1).

Referring back to the example of FIG. 1, and for a closest point of a triangle, the process 100 may include the normal component 108 using a weight component 116 to determine a weight associated with the closest point and/or a surface normal associated with the closest point. As described herein, the weight component 116 may determine the weight based at least on if the closest point is located at, on, or along a face, an edge, or a vertex of the triangle. For example, and as described in more detail herein, the weight component 116 may use a first weight if the closest point is located on the face, a second weight if the closest point is located along the edge, or a third weight if the closest point is located at the vertex. Additionally, the weight component 116 may use one or more techniques to determine the surface normal associated with the closest point and/or the triangle.

For instance, and referring back to the examples of FIGS. 4A-4C, the weight component 116 may associate the closest point 402 with a first weight, the closest point 408 with a second weight, and the closest point 204(3) with a third weight. The weight component 116 may also determine a surface normal 418 (which is only illustrated in the example of FIG. 4C for clarity reasons) associated with closest points 402, 408, and 204(3), where the surface normal 418 may be the same for each point 402, 408, and 204(3) and determined based at least on the surface (e.g., the first face 208(1)) of the triangle. For example, the weight component 116 may determine the surface normal 418 as being associated with a line, ray, and/or vector that is perpendicular to the surface of the triangle.

For an example of determining weights, if the closest point is located on a face 208 of the triangle mesh 202, then the weight component 116 may determine the first weight to include $2\pi$. Additionally, if the closest point is located along an edge 206 of the triangle mesh 202, then the weight component 116 may determine the second weight to include $\pi$. Furthermore, if the closest point is located at a vertex 204 of the triangle mesh, then the weight component 116 may determine the third weight as:

$$\text{weight}=\cos^{-1}(\text{dot}(\text{normalize}(-e_1),\text{normalize}(-e_2)) \quad (1)$$

In equation (1), $-e_1$ and $-e_2$ represent the edges 206 that are connected to the vertex 204 associated with the closest point. For instance, $-e_1$ may represent a first vector from the vertex 204 to a second vertex 204 of the triangle while $-e_2$ may represent a second vector from the vertex 204 to a third vertex 204 of the triangle. In other words, the third weight may be associated with an angle corresponding to the vertex 204, where the angle is measured between the edges 206 that connect to the vertex 204.

Referring back to the example of FIG. 1, the process 100 may include the normal component 108 using an update component 118 to update data associated with the processing of the triangles. For example, and for a first triangle represented by the triangle data 110, the location component 112 and/or the weight component 116 may determine information, such as a first minimum distance between a first closest point and the query point, first coordinates (e.g., barycentric coordinates) of the first closest point, the determined first weight associated with the first closest point, a first surface normal associated with the first triangle (e.g., the face of the first triangle), and/or any other information. As such, the update component 118 may initially generate data representing this information for the first triangle.

The update component 118 may then continue to update the data as the normal component 108 continues to process one or more additional triangles represented by the triangle data 110. For example, and for a second triangle, the update component 118 may determine whether a second closest point of the second triangle is closer to the query point than the first closest point, farther away from the query point than the first closest point, or a same point as the first closest point. In some examples, the update component 118 may determine that the second closest point is closer than the first closest point based at least on the second minimum distance between the second closest point and the query point being less than the first minimum distance (and/or the first minimum distance minus a tolerance distance represented by the threshold data 114). Additionally, the update component 118 may determine that the second closest point is farther than first closest point based at least on the second minimum distance being greater than the first minimum distance (and/or the first minimum distance plus a tolerance distance represented by the threshold data 114). Furthermore, the update component 118 may determine that the second closest point is a same point as the first closest point based at least on the second minimum distance being equal to the first minimum distance (and/or within a tolerance distance to the first minimum distance, where the tolerance distance is again represented by the threshold data 114).

The update component 118 may then use one or more techniques to update the data based at least on this closest point determination. For a first example, if the update component 118 determines that the second closest point is closer to the query point than the first closest point, then the update component 118 may update the data to indicate that the second closest point includes a new closest point to the query point. The update component 118 may further update the data to represent the information associated with the second closest point rather than the information associated with the first closest point. For example, the update component 118 may update the data to represent the second minimum distance between the second closest point and the query point, second coordinates (e.g., barycentric coordinates) of the second closest point, the determined second weight associated with the second closest point, a second surface normal associated with the second triangle (e.g., the face of the second triangle), and/or any other information.

For a second example, if the update component 118 determines that the second closest point is farther from the query point as compared to the first closest point, then the update component 118 may refrain from updating the data using the information associated with the second closest point. Still, for a third example, if the update component 118 determines that the second closest point is a same point as the first closest point, then the update component 118 may update at least a portion of the data. For example, the update component 118 may update the data to represent at least the second weight associated with the second closest point, the second surface normal associated with the second closest point, and/or the second triangle associated with the second closest point. In some examples, if the update component 118 further determines that the second minimum distance is less than the first minimum distance, then the update component 118 may further update the data by replacing the first minimum distance with the second minimum distance.

In some examples, the update component 118 may continue to process the information associated with one or more additional triangles and, based at least on the processing, continue to update the data using similar processes. In some examples, the update component 118 may continue to perform these processes until processing the triangles included in the identified leaf node and/or one or more triangles identified in one or more neighboring leaf nodes, which may also be represented by the triangle data 110. The update component 118 may then use the final data to determine final information associated with the closest point and/or the query point.

For example, the update component 118 may use the final data to determine an angle-weighted normal associated with the closest point. As described herein, the update component 118 may determine the angle-weighted sum using one or more weights represented by the final data and/or one or more surface normals represented by the final data. For example, if the closest point is located on a surface of a triangle, then the update component 118 may determine the angle-weighted normal using a single weight and single surface normal associated with the closest point. For instance, and referring to the example of FIG. 4A, the update component 118 may determine the angle-weighted normal by multiplying the weight associated with the closest point 402 to the surface normal of the triangle associated with the first face 208(1).

Additionally, if the closest point is located along an edge of two triangles, then the update component 118 may determine the angle-weighted normal using the weights and the surface normals of the two triangles. For instance, and referring to the example of FIG. 4B, the update component 118 may determine the angle-weighted normal by multiplying the respective weights associated with the closest point 408 as determined using triangles associated with the faces 208(1)-(2) to the surface normals associated with the triangles, and then adding the values together. Furthermore, if the closest point is located at a vertex of multiple triangles, then the update component 118 may determine the angle-weighted normal using the weights and the surface normals of the multiple triangles. For instance, and referring to the example of FIG. 4C, the update component 118 may determine the angle-weighted normal by multiplying the respective weights associated with the closest point 204(3) of the triangles associated with the faces 208(1)-(2) and 208(4)-(7) to the surface normals associated with the triangles, and then adding the values together.

The process 100 may include the normal component 108 outputting normal data 120, distance data 122, and/or point data 124 to a determination component 126. As described herein, the normal data 120 may represent at least the angle-weighted normal associated with the closest point determined for the query point, the distance data 122 may represent at least the minimum distance between the closest point and the query point, and the point data 124 may represent the coordinates of the closest point and/or one or more identifiers for one or more triangles associated with the closest point. As described herein, in some examples, the coordinates may include the barycentric coordinates associated with the closest point. While the example of FIG. 1 illustrates the normal component 108 as outputting the normal data 120, the distance data 122, and/or the point data 124 to the determination component 126, in other examples, the normal component 108 may output additional and/or alternative data.

The process 100 may then include the determination component 126 using the normal data 120, the distance data 122, and/or the point data 124 to determine whether the query point is located inside the 3D object, outside of the 3D object, or on a surface of the 3D object. For example, the determination component 126 may determine a value using at least the angle-weighted normal, the minimum distance, the coordinates associated with the closest point, and the coordinates associated with the query point, where the value may be represented by value data 128. In some examples, the determination component 126 determines the value by taking a dot product between the angle-weighted normal and a vector between the closest point and the query point. However, in other examples, the determination component 126 may use additional and/or alternative techniques to determine the value. The determination component 126 may then use the value to determine whether the query point is located inside, outside, or on a surface of the 3D object.

For example, the determination component 126 may determine that the query point is located inside of the 3D object based at least on the value including one or more first values, such as negative values. Additionally, the determination component 126 may determine that the query point is located on the surface of the 3D object based at least on the value including one or more second values, such as zero. Furthermore, the determination component 126 may determine that the query point is located outside of the 3D object based at least on the value including one or more third values, such as positive values. While these are just a few example techniques of how the determination component 126 may use the value to determine whether the query point is located inside, outside, and/or on the surface of the 3D object, in other examples, the determination component 126 may use additional and/or alternative techniques.

As further illustrated by the example of FIG. 1, the process 100 may include the determination component 126 outputting data 130, where the output data 130 may represent if the query point is located inside the 3D object, outside of the 3D object, and/or on the surface of the 3D object. In some examples, one or more additional systems may then use the output data 130 to perform one or more processes. For example, the additional system(s) may use the output data 130 to determine whether 3D objects intersect with one another, whether a given path of one of the 3D objects collides with another 3D object, and/or so forth. Additionally, the process 100 may continue to repeat using one or more additional query points.

The process 100 may also include a rendering component 132 using the output data 130 to generate object data 134 representing a rendering of the 3D object. For instance, the rendering component 132 may use the output component 130 to determine whether points are located within, on the surface of, or outside of the 3D object. For instance, the rendering component 132 may use the output data 130 to determine which points are visible within an image associated with the object and which points are not visible.

As described herein, in some examples, by performing the process 100 of FIG. 1, a determination of whether a query point is located inside, outside, or on a surface of a 3D object may be made with traversing the BVH once, such as when identifying the closest point. As such, the process 100 may not require performing preprocessing to determine information (e.g., angle-weighted normals) for determining whether points are located inside, outside, and/or on the surface of the 3D object and/or may not require storing such information. These improvements may be more important in certain circumstances, such as where the mesh associated with the 3D object is updated. For instance, even if the mesh is updated, and unlike other techniques that use angle-weighted normals, the process 100 may still not require any preprocessing and/or storing of information.

Additionally, in some examples, by performing the process 100 of FIG. 1, a determination of whether a query point is located inside, outside, or on the surface of the 3D object may be made even when the 3D object is non-watertight and/or include disconnected mesh parts. For example, by using the tolerance distance, even if two triangles are disconnected, but the closest point is located at or along an edge and/or vertex associated with one of the triangles, the process 100 is still able to identify both triangles and then use the information described herein to determine the angle-weighted normal.

Figure 6:
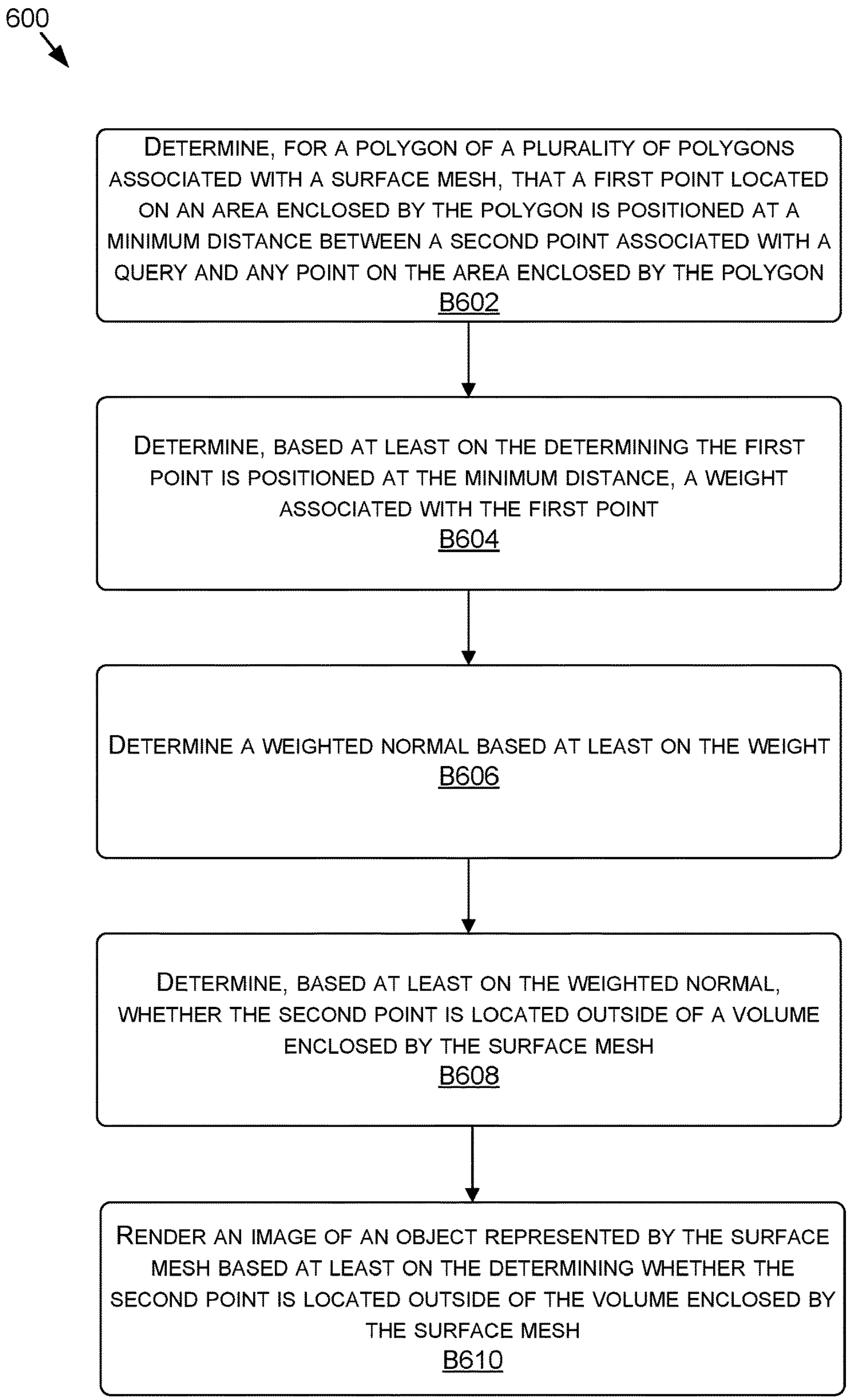
FIG. 6 a flow diagram showing a method for determining an angle-weighted normal during processing of a surface mesh and then using the angle-weighted normal to determine whether a query point is located outside of the surface mesh, in accordance with some embodiments of the present disclosure.
Figure 7:
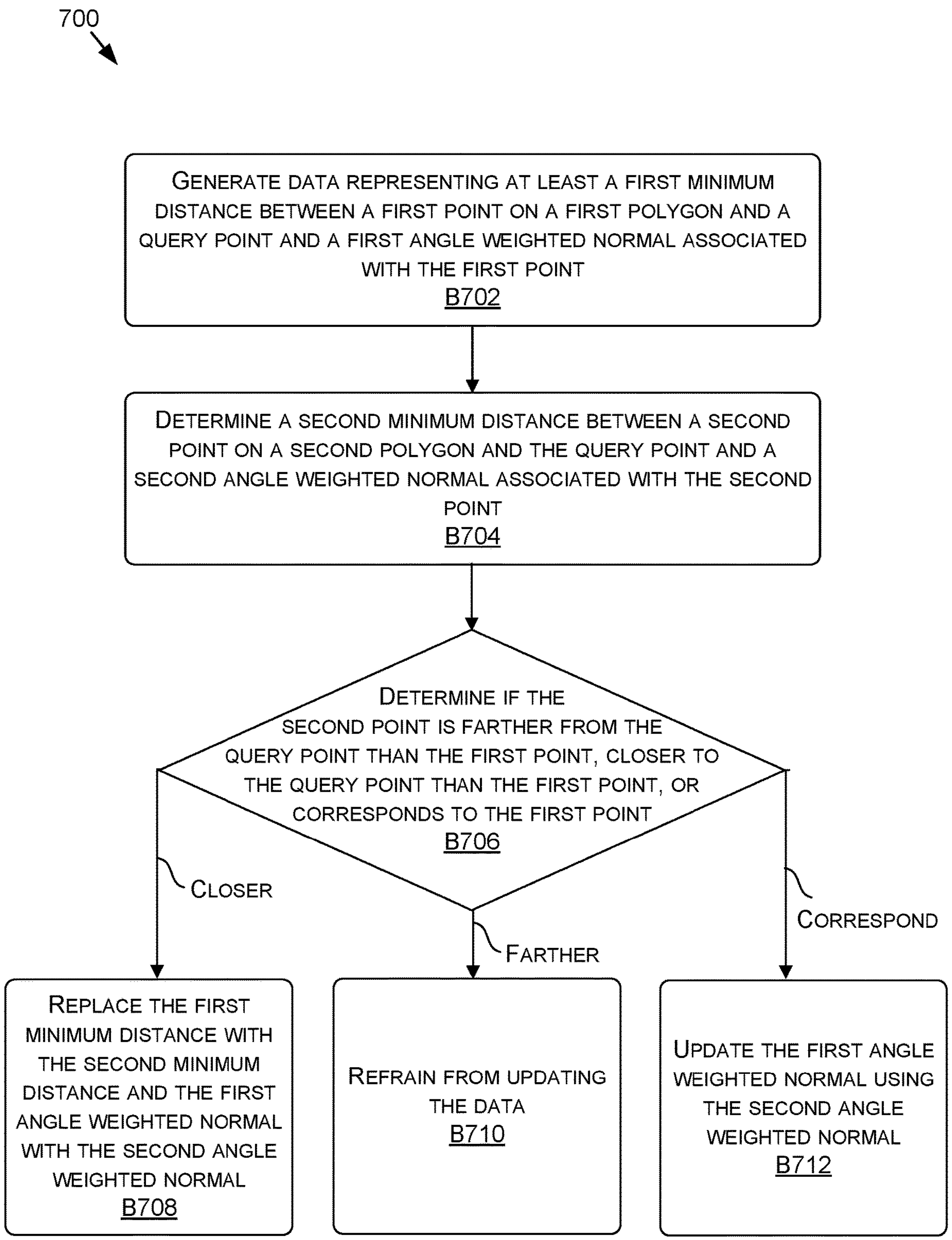
FIG. 7 a flow diagram showing a method for updating data associated with an angle-weighted normal while traversing through one or more triangles of a surface mesh, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, the methods 600 and 700 are described, by way of example, with respect to FIG. 1. However, these methods 600 and 700 may additionally or alternatively be executed by any one system, or any combination of systems, including, but not limited to, those described herein.

FIG. 6 a flow diagram showing a method 600 for determining an angle-weighted normal during processing of a surface mesh and then using the angle-weighted normal to determine whether a query point is located outside of the surface mesh, in accordance with some embodiments of the present disclosure. The method 600, at block B602, may include determining, for a polygon (e.g., a triangle) of a plurality of polygons associated with a surface mesh, that a first point located on an area enclosed by the polygon is positioned at a minimum distance between a second point associated with a query point and any point on the area enclosed by the polygon. For instance, the normal component 108 (e.g., the location component 112) may determine the minimum distance between the first point on the polygon and the second point (e.g., a query point), such as during a traversal of the BVH. In some examples, the normal component 108 may then determine if the first point is located on, along, or at a vertex, an edge, or a face of the polygon.

The method 600, at block B604, may include determining, based at least on the determining the first point is positioned at the minimum distance, a weight associated with the first point. For instance, the normal component 108 (e.g., the weight component 116) may determine the weight associated with the first point. As described herein, the normal component 108 may determine the weight based at least on whether the first point is located on, along, or at the vertex, the edge, or the face. For instance, the normal component 108 may determine the weight to include a first set weight if the first point is located at the vertex, a second set weight if the first point is located along the edge, or a third set weight if the first point is located on the face.

The method 600, at block B606, may include determining a weighted normal based at least on the weight. For instance, the normal component 108 (e.g., the update component 118) may determine the angle-weighted normal based at least on the weight associated with the first point and a surface normal associated with the first point. For example, the normal component 108 may determine the angle-weighted normal by multiplying the weight by the surface normal. In some examples, such as when the first point is located at a vertex or along an edge, the normal component 108 may further determine the angle-weighted normal based at least on one or more additional weights associated with one or more additional polygons that include the first point and/or one or more additional surface normals associated with the one or more additional polygons. For example, if the first point is located along an edge, the normal component 108 may determine the angle-weighted normal by multiplying the weight by the surface normal to determine a first angle-weighted normal, multiplying a second weight by a second surface normal associated with the other polygon to determine a second angle-weighted normal, and then adding the first angle-weighted normal and the second angle-weighted normal together.

The method 600, at block B608, may include determining, based at least on the weighted normal, whether the second point is located outside of a volume enclosed by the surface mesh. For instance, the determination component 126 may use at least the angle-weighted normal to determine whether the second point is located outside of the volume enclosed by the surface mesh, such as the second point is located inside, outside, or on a surface of the surface mesh. In some examples, to make the determination, the determination component 126 may determine a value by taking a dot product between the angle-weighted normal and a vector between the first point and the second point. The determination component 128 may then use the value to determine whether the second point is located inside, outside, or on the surface of the surface mesh.

The method 600, at block B610, may include rendering an image of an object represented by the surface mesh based at least on the determining whether the second point is located outside of the volume enclosed by the surface mesh. For instance, the rendering component 132 may use the output component 130 to determine whether points are located within, on the surface of, or outside of the 3D object. For instance, the rendering component 132 may use the output data 130 to determine which points are visible within an image associated with the object and which points are not visible. The rendering component 132 may then generate the image based at least on the determination by showing the points.

FIG. 7 a flow diagram showing a method 700 for updating data associated with an angle weight normal while traversing through polygons (e.g., triangles) of a surface mesh, in accordance with some embodiments of the present disclosure. The method 700, at block B702, may include generating data representing at least a first minimum distance between a first point on a first polygon and a query point and a first angle-weighted normal associated with the first point. For instance, the normal component 108 (e.g., the update component 118) may generate the data representing the first minimum distance between the first point and the query point and the first angle-weighted normal associated with the first point. As described herein, the normal component 108 may generate the data while traversing through the BVH to determine the closest point to the query point.

The method 700, at block B704, may include determining a second minimum distance between a second point on a second polygon and the query point and a second angle-weighted normal associated with the second point. For instance, the normal component 108 (e.g., the location component 112 and/or the update component 118) may determine the second minimum distance and the second angle-weighted normal associated with the second point.

The method 700, at block B706, may include determining if the second point is farther from the query point than the first point, closer to the query point than the first point, or corresponds to the first point. For instance, the normal component (e.g., the update component 118) may determine whether the second point is farther from the query point than the first point, closer to the query point than the first point, or corresponds to the first point. As described herein, in some examples, the normal component 108 may make the determination using one or more tolerance distances. For instance, the normal component 108 may determine that the second point is closer when the second minimum distance is less than the first minimum distance minus a tolerance distance. Additionally, the normal component 108 may determine that the second point is farther when the second minimum distance is greater than the first minimum distance plus a tolerance distance. Furthermore, the normal component 108 may determine that the second point corresponds to the first point when the second minimum distance is within a range that includes the first minimum distance minus and plus a tolerance distance.

If, at block B706, it is determined that the second point is closer than the first point, then the method 700, at block B708, may include replacing the first minimum distance with the second minimum distance and the first angle-weighted normal with the second angle-weighted normal. For instance, if the normal component 108 (e.g., the update component 118) determines that the second point is closer than the first point, then the normal component 108 may update the data by replacing the first minimum distance with the second minimum distance and the first angle-weighted normal with the second angle-weighted normal. In some examples, the normal component 108 may update the data using such a technique based at least on the second point including a closer point to the query point as compared to the first point.

However, if, at block B706, it is determined that the second point is farther than the first point, then the method 700, at block B710, may include refraining from updating the data. For instance, if the normal component 108 (e.g., the update component 118) determines that the second point is farther than the first point, then the normal component 108 may refrain from updating the data. In some examples, the normal component 108 may refrain from updating the data based at least on the first point including a closer point to the query point as compared to the second point.

However, if, at block B706, it is determined that the second point corresponds to the first point, then the method 700, at block B712, may include updating the first angle-weighted normal using the second angle-weighted normal. For instance, if the normal component 108 (e.g., the update component 118) determines that the second point corresponds to the first point, then the normal component 108 may update the data by adding the second angle-weighted normal to the first angle-weighted normal. In some examples, the normal component 108 may further update the data by replacing the first minimum distance with the second minimum distance, such as when the second minimum distance is less than the first minimum distance. In some examples, the normal component 108 may update the data using such techniques based at least on the first point and the second point including a closest point to the query point.

Example Computing Device

Figure 8:
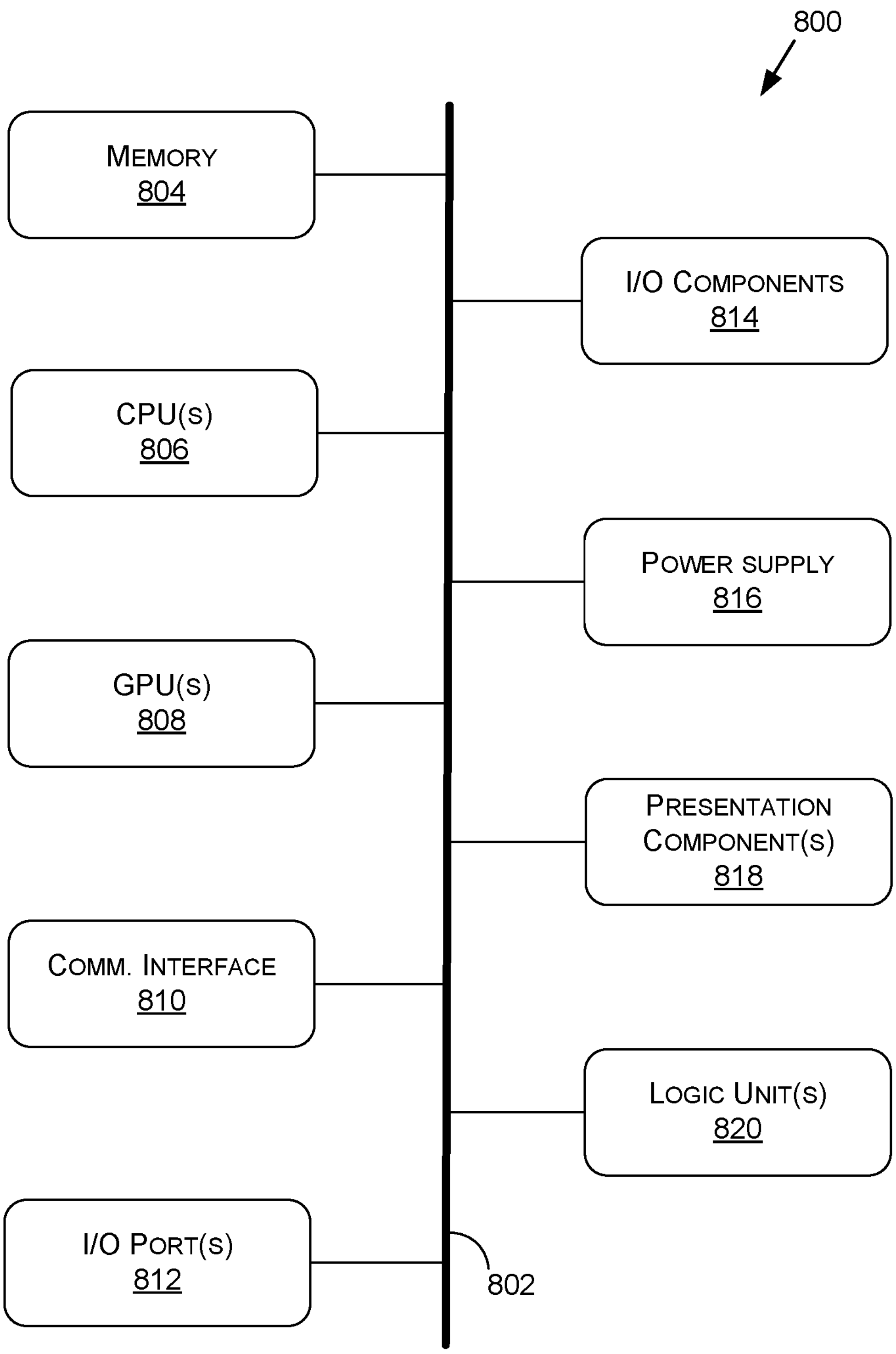
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as “workstation,” “server,” “laptop,” “desktop,” “tablet,” “client device,” “mobile device,” “hand-held device,” “game console,” “electronic control unit (ECU),” “virtual reality system,” and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term “modulated data signal” may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
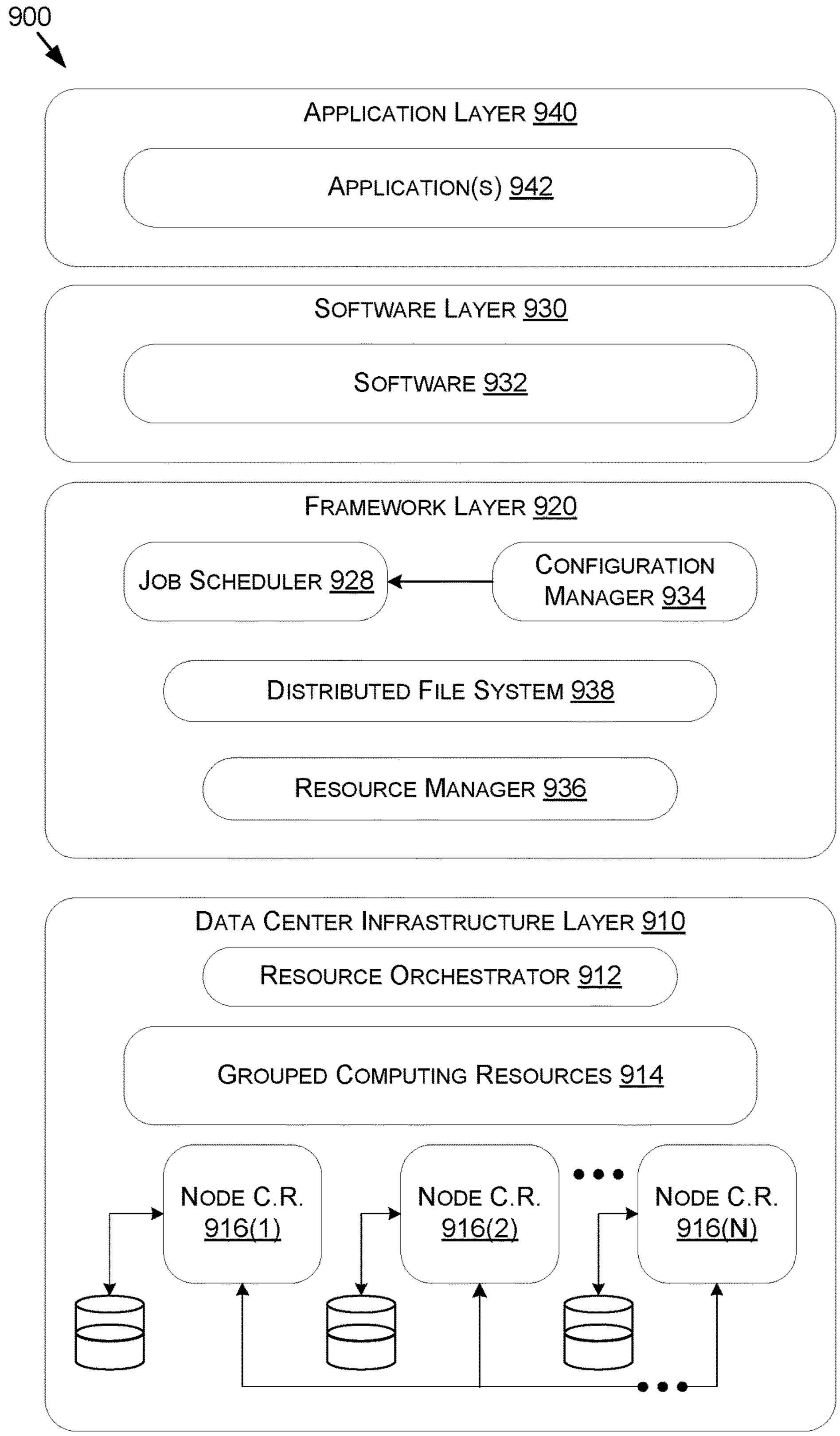
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE PARAGRAPHS

A: A method comprising: determining, for a polygon of a plurality of polygons associated with a surface mesh, that a first point located in an area enclosed by the polygon is positioned at a minimum distance between a second point associated with a query and any point in the area enclosed by the polygon; determining, based at least on the determining the first point is positioned at the minimum distance, a weight associated with the first point; determining a weighted normal based at least on the weight; determining, based at least on the weighted normal, whether the second point is located outside of a volume enclosed by the surface mesh; and rendering an image of an object represented by the surface mesh based at least on the determining whether the second point is located outside of the volume enclosed by the surface mesh.

B: The method of paragraph A, wherein the determining the weight comprises one of: determining, based at least on the first point being located at a vertex of the polygon, a first weight associated with the first point; determining, based at least on the first point being located along an edge of the polygon, a second weight associated with the first point; or determining, based at least on the first point being located on a face of the polygon, a third weight associated with the first point.

C: The method of paragraph B, further comprising one of: determining that the first point is located at the vertex based at least on a first distance between the vertex and the second point being within a threshold distance; determining that the first point is located along the edge based at least on a second distance between the edge and the second point being within the threshold distance; or determining that the first point is located on the face based at least on the first distance and the second distance being equal to or greater than the threshold distance.

D: The method of any one of paragraphs A-C, further comprising: determining, based at least on the minimum distance and a current minimum distance associated with a third point located in an area enclosed by a second polygon of the plurality of polygons, that the first point is closer to the second point than the third point, wherein the determining the weight is based at least on determining the first point is closer to the second point than the third point.

E: The method of any one of paragraph A-D, further comprising: determining that the minimum distance is greater than a threshold distance from a current minimum distance associated with a third point located in an area enclosed by a second polygon of the plurality of polygons, wherein the determining the weighted normal comprises determining, based at least on the minimum distance being greater than the threshold distance from the current minimum distance, the weighted normal based at least on the weight and a surface normal associated with the polygon.

F: The method of any one of paragraphs A-E, further comprising: determining that the minimum distance is less than a threshold distance from a current minimum distance associated with a third point located in an area enclosed by a second polygon of the plurality of polygons, wherein the determining the weighted normal comprises determining, based at least on the minimum distance being less than the threshold distance from the current minimum distance, the weighted normal based at least on the weight, a first surface normal associated with the polygon, a second weight associated with the third point, and a second surface normal associated with the second polygon.

G: The method of any one of paragraphs A-F, further comprising: determining, for a second polygon of the plurality of polygons associated with the surface mesh, that a third point located in an area enclosed by the second polygon is positioned at a second minimum distance between any point in the area enclosed by the second polygon and the second point associated with the query; determining that the third point does not include a closest point to the second point based at least on the second minimum distance being greater than at least one of the minimum distance or the minimum distance plus a threshold distance; and based at least on the third point not including the closest point, one of: refraining from determining a second weight associated with the third point; or refraining from performing the determining of the weighted normal based at least on the second weight.

H: The method of any one of paragraphs A-G, further comprising determining the plurality of polygons associated with the surface mesh based at least on traversing a bounding volume hierarchy associated with the surface mesh.

I: The method of any one of paragraphs A-H, wherein the determining whether the second point is located outside of the surface mesh comprises: determining a value based at least on the weighted normal, one or more first coordinates associated with the first point, and one or more second coordinates associated with the second point; and one of: determining that the second point is located within a volume enclosed by the surface mesh based at least on the value including a negative value; or determining that the second point is located outside of the volume enclosed by the surface mesh based at least on the value including a positive value.

J: A system comprising: one or more processing units to: determine, for one or more polygons of a plurality of polygons associated with a surface mesh, that one or more points located in an area enclosed by the one or more polygons are associated with a closest point to a query point; determine one or more weights associated with the one or more points; determine a weighted normal based at least on the one or more weights; determine, based at least on the weighted normal, whether the query point is located outside of a volume enclosed by the surface mesh; and render an image of an object represented by the surface mesh based at least on determining whether the query point is located outside of the volume enclosed by the surface mesh.

K: The system of paragraph J, wherein the determination of a weight of the one or more weights for a point of the one or more points comprises one of: determining, based at least on the point being located at a vertex of a polygon of the one or more polygons, a first weight associated with the point; determining, based at least on the point being located along an edge of the polygon, a second weight associated with the point; or determining, based at least on the point being located on a face of the polygon, a third weight associated with the point.

L: The system of paragraph K, wherein the one or more processing units are further to perform at least one of: determine that the point is located at the vertex based at least on a first distance between the vertex and the query point being within a threshold distance; determine that the point is located along the edge based at least on a second distance between the edge and the query point being within the threshold distance; or determine that the point is located on the face based at least on the first distance and the second distance being equal to or greater than the threshold distance.

M: The system of any one of paragraphs J-L, wherein the one or more processing units are further to: compute one or more surface normals associated with the one or more polygons, wherein the determination of the weighted normal is further based at least on the one or more surface normals.

N: The system of any one of paragraphs J-M, wherein: the one or more polygons includes two or more polygons; the one or more points include two or more points associated with a closest point located in an area enclosed by the two or more polygons; and the determination of the weighted normal comprises determining the weighted normal based at least on two or more weights associated with the two or more points and two or more surface normals associated with the two or more polygons.

O: The system of any one of paragraphs J-N, wherein the one or more processing units are further to determine the one or more polygons associated with the surface mesh based at least on traversing a bounding volume hierarchy associated with the surface mesh.

P: The system of any one of paragraphs J-O, wherein the determination of whether the query point is located outside of the surface mesh comprises: determining a value based at least on the weighted normal, one or more first coordinates associated with the closest point; or one or more second coordinates associated with the query point; and one of: determining that the query point is located within a volume enclosed by the surface mesh based at least on the value including a negative value; or determining that the query point is located outside of the volume enclosed by the surface mesh based at least on the value including a positive value.

Q: The system of any one of paragraphs J-P, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational AI operations; a system implementing one or more large language models (LLMs); a system for generating synthetic data; a system incorporating one or more virtual machines (VMs); a system implemented at least partially in a data center; or a system implemented at least partially using cloud computing resources.

R: processor comprising: one or more processing units to render an image that depicts at least a portion of an object by determining whether a query point is located outside of a volume enclosed by a surface mesh associated with the object using at least a weighted normal, wherein the weighted normal is determined based at least on one or more surface normals associated with one or more polygons for which a closest point is located by determining the closest point to the query point.

S: The processor of paragraph R, wherein the one or more processing units are further to: determine one or more weights associated with one or more points located in an area enclosed by the one or more polygons, the one or more points being associated with the closest point, wherein the determination of the weighted normal is further based at least on the one or more weights.

T: The processor of paragraph R or paragraph S, wherein the processor is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational AI operations; a system implementing one or more large language models (LLMs); a system for generating synthetic data; a system incorporating one or more virtual machines (VMs); a system implemented at least partially in a data center; or a system implemented at least partially using cloud computing resources.

What is claimed is:

1. A method comprising:

determining, for a first polygon of a plurality of polygons associated with a surface mesh, that a first point located in an area enclosed by the first polygon is positioned at a first minimum distance between a second point associated with a query and any point in the area enclosed by the first polygon;

determining that the first minimum distance is less than a threshold distance from a second minimum distance associated with a third point located in an area enclosed by a second polygon of the plurality of polygons;

determining a first weight associated with the first point and a second weight associated with the second point;

determining a weighted normal based at least on the first weight, a first surface normal of the first polygon, the second weight, and a second surface normal of the second polygon;

determining, based at least on the weighted normal, whether the second point is located outside of a volume enclosed by the surface mesh; and rendering an image of an object represented by the surface mesh based at least on the determining whether the second point is located outside of the volume enclosed by the surface mesh.

2. The method of claim 1, wherein the first weight includes one of:

a first value based at least on the first point being located at a vertex of the first polygon; or a second value based at least on the first point being located along an edge of the first polygon.

3. The method of claim 2, further comprising one of:

determining that the first point is located at the vertex based at least on a first distance between the vertex and the second point being within a second threshold distance; or determining that the first point is located along the edge based at least on a second distance between the edge and the second point being within the threshold distance.

4. The method of claim 1, further comprising:

determining, based at least on the first minimum distance and a current minimum distance associated with a fourth point located in an area enclosed by a third polygon of the plurality of polygons, that the first point is closer to the second point than the fourth point; and determining the first point includes a closest point to the second point based at least on the first point being closer to the second point than the fourth point.

5. The method of claim 1, wherein one of:

the first point is located on an edge of the first polygon and the third point is located on the edge of the second polygon; or the first point includes a vertex of the first polygon and the third point includes the vertex of the second polygon.

6. The method of claim 1, further comprising:

determining that the first minimum distance is also less than the threshold distance from a third minimum distance associated with a fourth point located in an area enclosed by a third polygon of the plurality of polygons, wherein the determining the weighted normal is further based at least on a third weight associated with the third point and a third surface normal associated with the third polygon.

7. The method of claim 1, further comprising:

determining, for a third polygon of the plurality of polygons associated with the surface mesh, that a fourth point located in an area enclosed by the third polygon is positioned at a third minimum distance between any point in the area enclosed by the third polygon and the second point associated with the query;

determining that the fourth point does not include a closest point to the second point based at least on the third minimum distance being greater than at least one of the first minimum distance or the first minimum distance plus the threshold distance; and based at least on the fourth point not including the closest point, one of:

refraining from determining a third weight associated with the fourth point; or refraining from performing the determining of the weighted normal based at least on the third weight.

8. The method of claim 1, further comprising determining the plurality of polygons associated with the surface mesh based at least on traversing a bounding volume hierarchy associated with the surface mesh.

9. The method of claim 1, wherein the determining whether the second point is located outside of the surface mesh comprises:

determining a value based at least on the weighted normal, one or more first coordinates associated with the first point, one or more second coordinates associated with the second point, and one or more third coordinates associated with the third point; and one of:

determining that the second point is located within the volume enclosed by the surface mesh based at least on the value including a negative value; or determining that the second point is located outside of the volume enclosed by the surface mesh based at least on the value including a positive value.

10. A system comprising:

one or more processors to:

determine, for at least a first polygon and a second polygon of a plurality of polygons associated with a surface mesh, that a first point located in an area enclosed by the first polygon and a second point located in an area enclosed by the second polygon are associated with a closest point to a query point based at least on the first point being within a first minimum distance to the query point and the second point being within a second minimum distance to the query point;

determine a first weight associated with the first point and a second weight associated with the second point;

determine a weighted normal based at least on the first weight, a first surface normal of the first polygon, the second weight, and a second surface normal of the second polygon;

determine, based at least on the weighted normal, whether the query point is located outside of a volume enclosed by the surface mesh; and render an image of an object represented by the surface mesh based at least on determining whether the query point is located outside of the volume enclosed by the surface mesh.

11. The system of claim 10, wherein one of:

the first weight and the second weight include a first value based at least on the closest point being located at a vertex of the first polygon and the second polygon; or the first weight and the second weight include a second value based at least on the closest point being located along an edge of the first polygon and the second polygon.

12. The system of claim 11, wherein the one or more processors are further to perform at least one of:

determine that the first point is located at the vertex based at least on a first distance between the vertex and the query point being within a threshold distance; or determine that the first point is located along the edge based at least on a second distance between the edge and the query point being within the threshold distance.

13. The system of claim 10, wherein the one or more processors are further to:

compute, based at least on the first point including the closest point, the first surface normal associated with the first polygon; and compute, based at least on the second point including the closest point, the second surface normal associated with the second polygon.

14. The system of claim 10, wherein the one or more processors are further to determine the first polygon and the second polygon associated with the surface mesh based at least on traversing a bounding volume hierarchy associated with the surface mesh.

15. The system of claim 10, wherein the determination of whether the query point is located outside of the surface mesh comprises:

determining a value based at least on the weighted normal, one or more first coordinates associated with the closest point; one or more second coordinates associated with the second point, and one or more third coordinates associated with the query point; and one of:

determining that the query point is located within the volume enclosed by the surface mesh based at least on the value including a negative value; or determining that the query point is located outside of the volume enclosed by the surface mesh based at least on the value including a positive value.

16. The system of claim 10, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

17. One or more processors comprising processing circuitry to:

determine, for polygons of a plurality of polygons associated with a surface mesh, that points located in areas enclosed by the polygons are positioned at minimum distances from a query point;

determine that the minimum distances are within a threshold distance;

determine, based at least on the minimum distances being within the threshold distance, weights associated with the points;

determine a weighted normal based at least on the weights and surface normals associated with the polygons;

determine, based at least on the weighted normal, whether the query point is located outside of a volume enclosed by the surface mesh; and render an image of an object represented by the surface mesh based at least on whether the query point is located outside of the volume enclosed by the surface mesh.

18. The one or more processors of claim 17, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

19. The one or more processors of claim 17, wherein the processing circuitry is further to determine that the points are associated with a closest point to the query point based at least on the minimum distances being within the threshold distance.

20. The one or more processors of claim 17, wherein the processing circuitry is further to:

determine, based at least on the query point, second polygons associated with a first node of a bounding volume hierarchy associated with the surface mesh; and determine, based at least on the first node, one or more second nodes of the bounding volume hierarchy that are associated with the polygons.

* * * * *